US012782721B2

(12) United States Patent
von Spiegel

(10) Patent No.: US 12,782,721 B2
(45) Date of Patent: Nov. 3, 2026

(54) HEAD-UP DISPLAY IMAGE GENERATING UNIT WITH CASCADED MIRROR

(71) Applicant: AUMOVIO Germany GmbH, Hannover (DE)

(72) Inventor: Wolff von Spiegel, Mühltal (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 272 days.

(21) Appl. No.: 18/034,185

(22) PCT Filed: Oct. 26, 2021

(86) PCT No.: PCT/DE2021/200165
§ 371 (c)(1),
(2) Date: Apr. 27, 2023

(87) PCT Pub. No.: WO2022/089697
PCT Pub. Date: May 5, 2022

(65) Prior Publication Data

US 2023/0393389 A1 Dec. 7, 2023

(30) Foreign Application Priority Data

Oct. 29, 2020 (DE) ..................... 10 2020 213 659.9
Dec. 15, 2020 (DE) ..................... 10 2020 215 887.8

(51) Int. Cl.
*G02B 27/01* (2006.01)
*G02B 3/08* (2006.01)

(52) U.S. Cl.
CPC ............ *G02B 27/0101* (2013.01); *G02B 3/08* (2013.01); *G02B 2027/0118* (2013.01); *G02B 2027/0123* (2013.01)

(58) Field of Classification Search
CPC ........ G02B 27/0101; G02B 2027/0118; G02B 2027/0123; G02B 3/08
See application file for complete search history.

(56) References Cited

U.S. PATENT DOCUMENTS 5,313,326 A 5/1994 Ramsbottom
2010/0195022 A1 8/2010 Shikii et al.
2013/0010366 A1* 1/2013 Nakamura ......... G02B 27/0101 359/633

(Continued)

FOREIGN PATENT DOCUMENTS

CN 101156106 A 4/2008
CN 101743510 6/2010

(Continued)

OTHER PUBLICATIONS

Office Action dated Jun. 8, 2021 from corresponding German patent application No. 10 2020 215 887.8.

(Continued)

*Primary Examiner* — Cara E Rakowski
(74) *Attorney, Agent, or Firm* — COZEN O'CONNOR

(57) ABSTRACT

A head-up display for transportation, having a picture generating unit for generating an image, an optical unit for projecting the image through a mirror unit, and a folding mirror whose angle of incidence and angle of reflection are not the same and wherein the folding mirror is arranged between a light source and a display element through which light therefrom radiates is disclosed.

1 Claim, 4 Drawing Sheets

(56) References Cited

U.S. PATENT DOCUMENTS

| | | | |
|---|---|---|---|
| 2015/0036221 | A1 | 2/2015 | Stephenson |
| 2015/0362221 | A1 | 12/2015 | Yates et al. |
| 2016/0209649 | A1 | 7/2016 | Shigeno et al. |
| 2018/0217488 | A1 | 8/2018 | Irzyk et al. |
| 2018/0252917 | A1 | 9/2018 | Takahashi et al. |
| 2019/0212560 | A1 | 7/2019 | Sugiyama et al. |

FOREIGN PATENT DOCUMENTS

| | | | | | |
|---|---|---|---|---|---|
| CN | 106233185 | | | 12/2016 | |
| CN | 109564349 | | | 4/2019 | |
| CN | 109564349 | A | * | 4/2019 | ......... G02B 27/0149 |
| DE | 4102678 | A1 | | 8/1991 | |
| JP | 2002036909 | | | 2/2002 | |
| JP | 2012123393 | | | 6/2012 | |
| JP | 2017137054 | | | 8/2017 | |
| KR | 20060106386 | | | 10/2006 | |
| WO | WO-2014009717 | A1 | * | 1/2014 | ............... G02B 6/00 |
| WO | 2014041689 | A1 | | 3/2014 | |
| WO | 2018208618 | A1 | | 11/2018 | |
| WO | 2020203767 | | | 10/2020 | |

OTHER PUBLICATIONS

International Search Report and Written Opinion dated Feb. 2, 2022 from corresponding International patent application No. PCT/DE2021/200165.

Office Action of corresponding Chinese Application No. 202180069098.4, Jul. 19, 2025.

Office Action of corresponding Chinese Application No. 202180069098.4, dated Aug. 7, 2026.

* cited by examiner

HEAD-UP DISPLAY IMAGE GENERATING UNIT WITH CASCADED MIRROR

CROSS REFERENCE TO RELATED APPLICATIONS

This U.S. patent application claims the benefit of PCT application no. PCT/DE2021/200165, filed Oct. 26, 2021, which claims the benefit of German patent application No. 10 2020 213 659.9, filed Oct. 29, 2020, and German patent application No. 10 2020 215 887.8, filed Dec. 15, 2020, all of which are hereby incorporated by reference.

TECHNICAL FIELD

The present disclosure relates to a head-up display having an image generating unit with a folding mirror.

BACKGROUND

A head-up display, also referred to as a HUD, is understood to mean a display system in which the viewer may maintain their viewing direction, since the contents to be represented are superposed into their visual field. While such systems were originally used primarily in the aerospace sector due to their complexity and costs, they are now also being used in large-scale production in the automotive sector.

Head-up displays generally comprise a picture generating unit (PGU), an optical unit, and a mirror unit. The picture generating unit generates the image and for this purpose uses at least one display element. Most head-up displays nowadays use LCD-based displays (LCD: liquid crystal display) for generating images. The optical unit directs the image onto the mirror unit. The mirror unit is a partially reflecting, light-transmissive pane. The viewer thus sees the contents represented by the picture generating unit as a virtual image and sees the real world behind the pane at the same time. In the automotive sector, the windshield is often used as mirror unit, and the curved shape of the windshield must be taken into account in the representation. Due to the interaction between the optical unit and the mirror unit, the virtual image is an enlarged representation of the image produced by the picture generating unit.

DE 41 02 678 A1 discloses a head-up display for transportation, having a picture generating unit for generating an image, an optical unit for projecting the image through a mirror unit onto a virtual image plane, and a folding mirror whose angle of incidence and angle of reflection are not the same. This property is achieved, for example, by holographic component parts, by diffraction gratings, or by Fresnel mirrors.

U.S. Pat. No. 5,313,326 A, WO 2014/041689 A, US 2015/0362221 A1, and US 2018/252917 A1 also describe head-up displays in which a folding mirror is used whose angle of incidence and angle of reflection are not the same.

In these known head-up displays, the folding mirror, whose angle of incidence and angle of reflection are not the same, is arranged in the imaging path. Here, the folding mirror having this property can have an unfavorable influence on the image quality and/or the sensitivity to stray light.

US 2010/0195022 A1 discloses a background light fora liquid crystal display, in which an edge of a light guide is provided with a multiplicity of reflective surfaces that expand a tightly focused laser beam into a broad light beam. However, the use of a laser light source in head-up displays is primarily known when using micromirror units (known as DMDs, digital micromirror devices), which require a light beam having a very small cross section with a small opening angle.

A head-up display that is improved over the known head-up displays is desirable.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

According to the disclosure, the folding mirror, whose angle of incidence and angle of reflection are not the same, is arranged between a light source and a display element through which light therefrom radiates, i.e., in the illumination path. An unfavorable influence of the folding mirror on the image quality and/or the sensitivity to stray light is avoided. The arrangement of the folding mirror in the illumination path furthermore permits spreading of the illumination beam and polarization recycling. A further advantage relates to the installation space. This installation space advantage is based on the ability to position the light source more freely while maintaining the desired angle in the region of the display. The smaller light source additionally saves space in the form of implementation, for example as light-emitting diodes with collimators.

The difference between the angle of incidence and the angle of reflection of the folding mirror is position-dependent. Parallel incident rays impinging at different points of the folding angle are thus reflected at different angles of reflection. This is particularly easy to achieve using Fresnel structures and has the advantage that expansion of the incident light beam and a location-dependent distribution of the intensity of the reflected light beam are attainable. Strictly speaking, an optical element with the properties mentioned is no longer a folding mirror. However, this term will still be used here to designate the optical element that is arranged according to the disclosure instead of a conventional folding mirror.

The folding mirror has many microstructures on its reflective surface that each satisfy the known rule that the angle of incidence is equal to the angle of reflection. In this way, the folding mirror is particularly easy to produce.

According to one embodiment of the disclosure, the microstructures have an inherent curvature. This makes it possible to integrate one or more further functions into the folding mirror.

According to one embodiment of the disclosure, the microstructures have slight angle deviations from their ideal angle. Slight angle deviations have been introduced into the microstructures. This makes it possible, for example in the case of a Fresnel structure, to blur any stripes that may occur in the light distribution. Integration of a scattering function in the folding mirror is thus made possible.

According to one embodiment of the disclosure, the gaps are utilized for polarization recycling. In the case of a Fresnel structure, the cross-sectional area of the light beam is spread in one direction (from h' to h) by being reflected at individual segments. However, each segment also contains a return side, which is required but does not participate in the primary redirection function. This return side may be used for polarization recycling: An optical function is introduced downstream of the folding mirror, which optical function reflects the undesired polarization component back to the folding mirror, preferably concentrated on the return sides of the segments. These should be provided with a function that changes the light polarization, ideally rotates it by 90 degrees and casts it back to the polarization-reflecting component. At least some of the originally incorrectly polarized light may then pass here and be used in the desired polarization direction.

According to one embodiment of the disclosure, a pentamirror approach is provided. The pentamirror approach makes the deflection angle insensitive to deviations in the macroscopic mirror angle. Like for a pentamirror, the microstructure is designed in such a way that the light passes through an even number of reflections in order to be redirected. In the case of simple reflection, the angle error of the output light is approximately twice the angle error of the mirror. If there are two mirrors in a common mechanical arrangement that causes the overall reflection, the angle error of the first and second mirrors largely cancel each other out. This means that the orientation of this component is significantly less critical for the direction of the output light. The system becomes more tolerant of assembly tolerances.

A cascaded design with two folding mirrors and spreading in two directions is likewise advantageous.

BRIEF DESCRIPTION OF THE DRAWINGS

Further features of the present disclosure will be evident from the following detailed description and the appended claims in conjunction with the figures, wherein:

DETAILED DESCRIPTION

For a better understanding of the principles of the present disclosure, embodiments of the disclosure will be explained in more detail below with reference to the figures. The same reference signs are used in the figures for identical or functionally identical elements and are not necessarily described again for each figure. It goes without saying that the disclosure is not limited to the illustrated embodiments and that the described features may also be combined or modified without departing from the scope of protection of the disclosure as defined in the appended claims.

Figure 1:
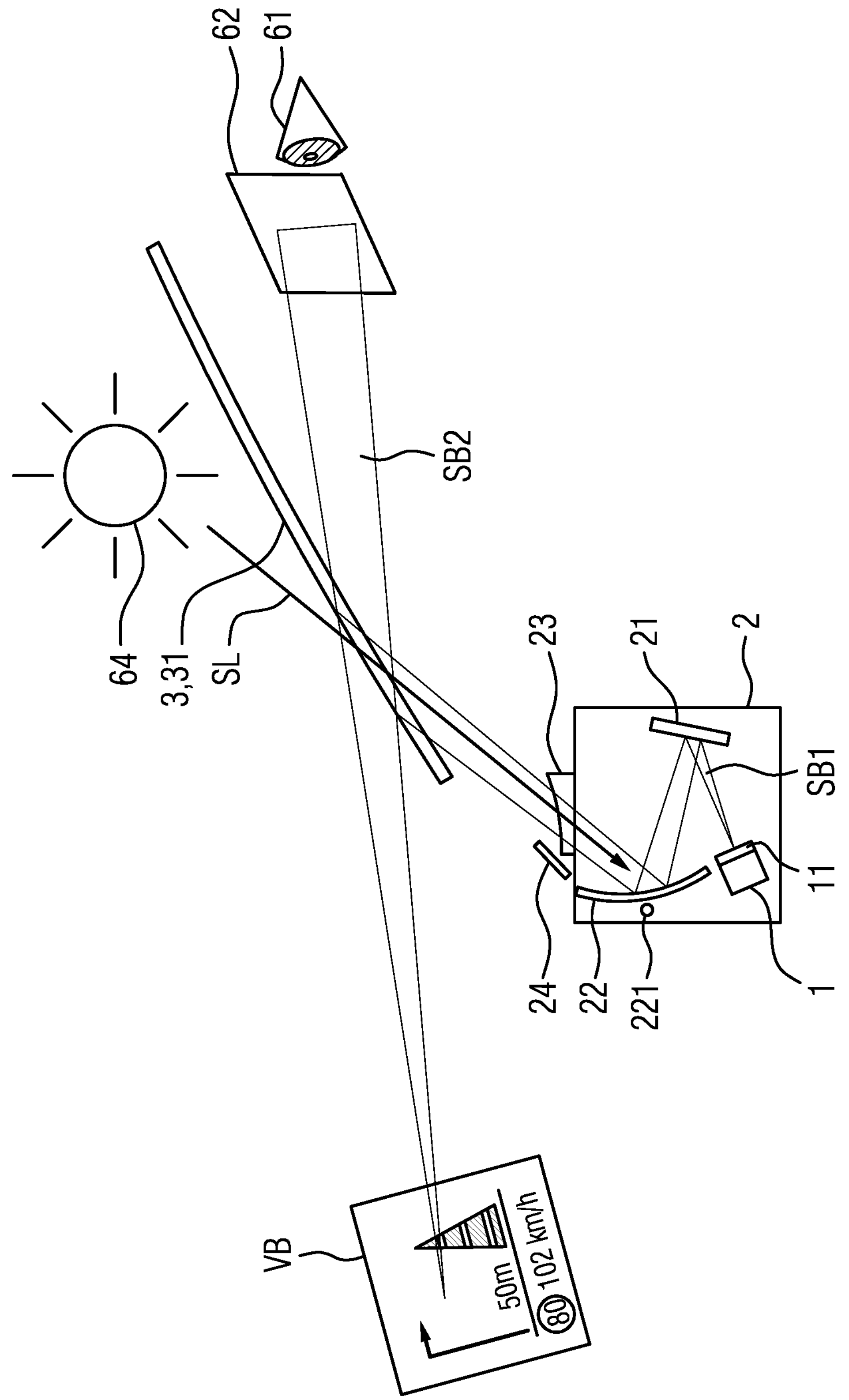
FIG. 1 schematically shows a head-up display according to the prior art for a motor vehicle.

FIG. 1 shows a schematic diagram of a head-up display according to the prior art for a motor vehicle. The head-up display has a picture generating unit 1, an optical unit 2, and a mirror unit 3. A beam of rays SB1 emanates from a display element 11 and is reflected by a folding mirror 21 onto a curved mirror 22, which reflects it in the direction of the mirror unit 3. The mirror unit 3 is represented here as a windshield 31 of a motor vehicle. From there, the beam of rays SB2 travels in the direction of an eye 61 of a viewer.

The viewer sees a virtual image VB that is located outside the motor vehicle, above the engine hood or even in front of the motor vehicle. Due to the interaction between the optical unit 2 and the mirror unit 3, the virtual image VB is an enlarged representation of the image displayed by the display element 11. A speed limit, the current vehicle speed, and navigation instructions are symbolically represented here. As long as the eye 61 is within the eyebox 62, which is indicated by a rectangle, all elements of the virtual image are visible to the eye 61. If the eye 61 is outside the eyebox 62, the virtual image VB is only partially or not at all visible to the viewer. The larger the eyebox 62 is, the less restricted the viewer is when choosing their seating position.

The curvature of the curved mirror 22 is adapted to the curvature of the windshield 31 and ensures that the image distortion is stable over the entire eyebox 62. The curved mirror 22 is rotatably mounted by a bearing 221. The rotation of the curved mirror 22 that this allows makes it possible to displace the eyebox 62 and thus to adapt the position of the eyebox 62 to the position of the eye 61. The folding mirror 21 serves to ensure that the path traveled by the beam of rays SB1 between the display element 11 and the curved mirror 22 is long and, at the same time, that the optical unit 2 is nevertheless compact. The optical unit 2 is delimited from the environment by a transparent cover 23. The optical elements of the optical unit 2 are thus protected, for example, against dust located in the interior of the vehicle. An anti-glare protection 24 serves to reliably absorb the light reflected via the interface of the cover 23 so that the viewer is not dazzled. In addition to the sunlight SL, the light from another stray light source 64 might also reach the display element 11.

Figure 2:
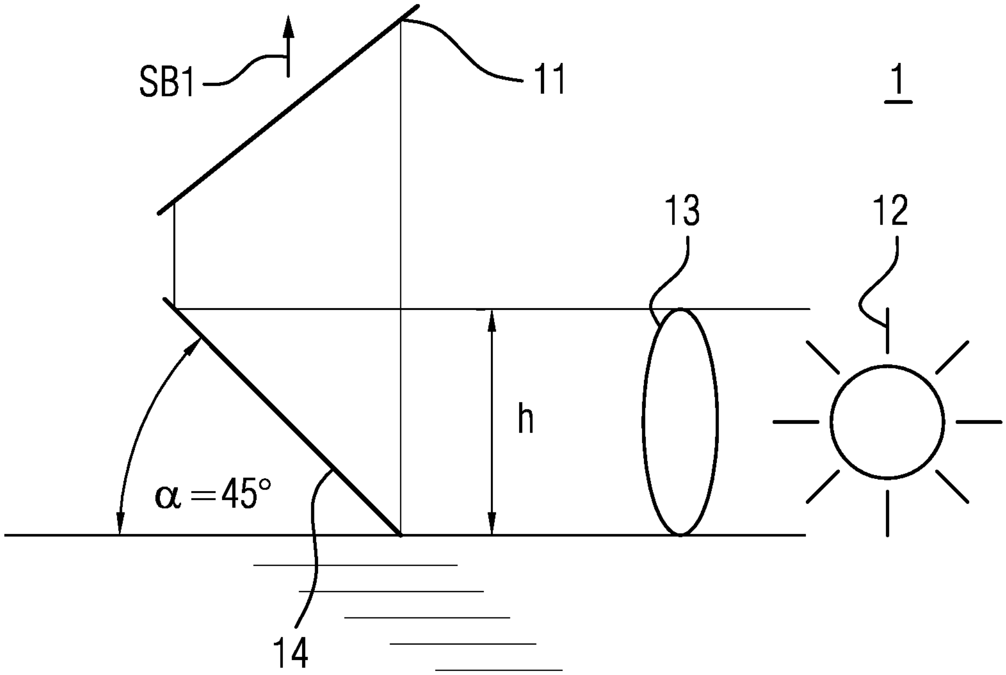
FIG. 2 schematically shows the picture generating unit of a head-up display.

FIG. 2 schematically shows the picture generating unit 1 of a head-up display. It shows the light source 12, whose light is collimated by a collimator 13. The collimated light beam has a height h in the image plane. It is reflected by a mirror 14 arranged at an angle of $\alpha=45°$ and radiates through the display element 11, from where it enters the optical unit 2 (not shown here) as a beam of rays SB1.

Figure 3:
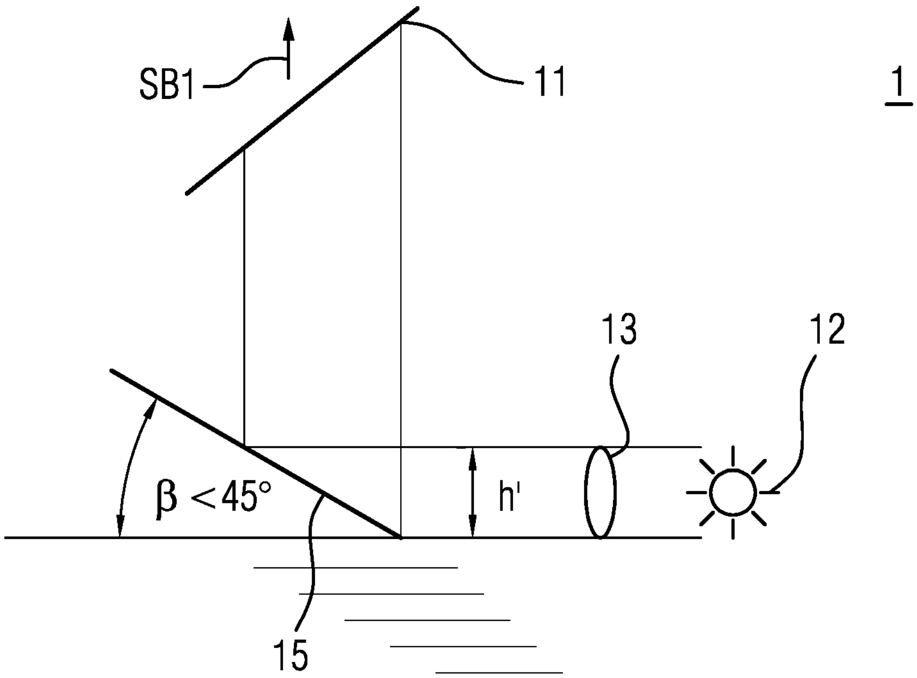
FIG. 3 schematically shows the picture generating unit of a head-up display according to the disclosure.

FIG. 3 schematically shows the picture generating unit of a head-up display according to the disclosure. It illustrates the folding mirror 15 according to the disclosure, which is arranged at an angle of $\beta<45°$. Due to its property that the angle of incidence and angle of reflection are not the same, nothing changes in the basic direction of the light coming toward it from the light source 12 and of the light reflected by it in the direction of the display element 11 compared with the previous figure. However, the extents of the light source 12 and of the collimator 13 and also the height h' of the collimated light beam are smaller than in the previous figure. A saving in terms of installation space is consequently realized. The height h' in this figure is smaller than the height h in the previous figure. Not only does this mean that the space required by the arrangement is smaller, but also that the illumination unit, here the light source 12, only needs to produce a flatter light beam, as a result of which the light source 12 is also more compact. An advantage in terms of installation space that is likewise important is based on the ability to position the light source more freely while at the same time maintaining the desired angle in the region of the display. The smaller light source additionally saves space in the form of implementation, for example as light-emitting diodes.

Figure 4:
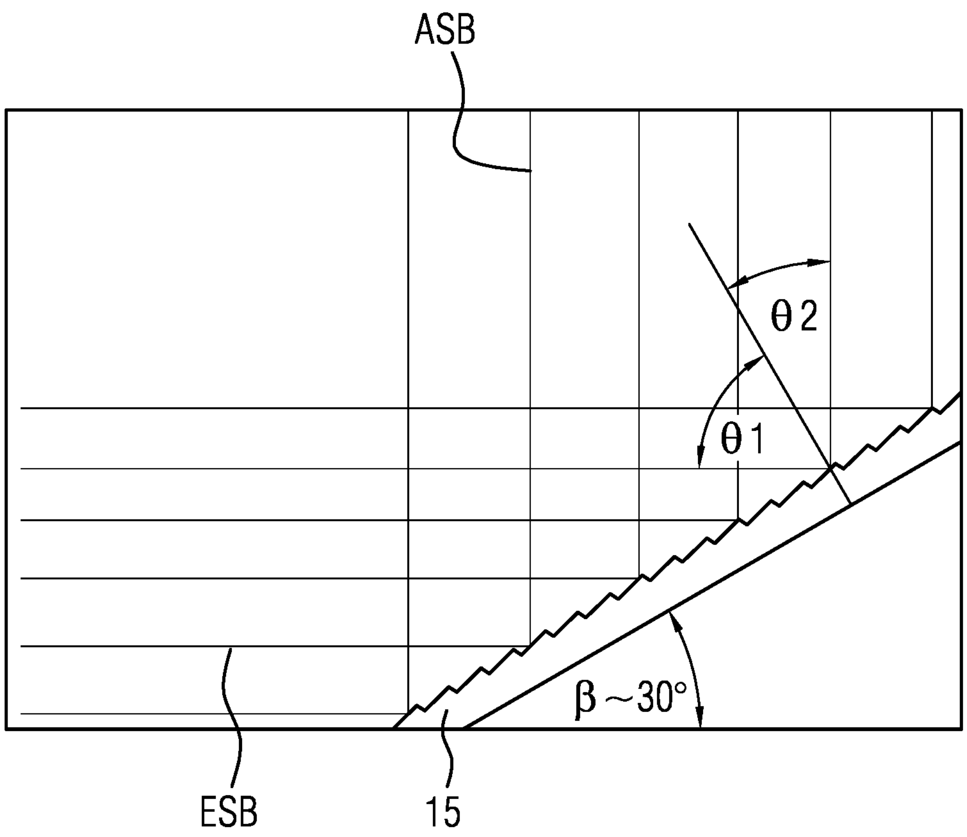
FIG. 4 schematically shows a folding mirror of a head-up display according to the disclosure.

FIG. 4 schematically shows a folding mirror 15 of a head-up display according to the disclosure. It shows that the folding mirror 15 has many microstructures 16 on its reflective surface that each satisfy the known rule that the angle of incidence is equal to the angle of reflection. In an embodiment, which is not shown in the figure, the microstructures 16 have an inherent curvature which leads to an expansion of the reflected beam of rays. Viewed macroscopically, however, the angle of incidence 81 of the folding mirror 15 is greater than its angle of reflection 82. The figure shows an incident beam of rays ESB that hardly expands and, after reflection at the folding mirror 15, has a greater expansion as the reflected beam of rays ASB. In the pure form, the microstructured surfaces are not curved. This only becomes relevant in the development mentioned, in which the formation of stripes needs to be reduced. According to an embodiment, curved, microstructured surfaces make it possible to give the folding mirror an additional function. Strictly speaking, this additional function means that it may no longer be designated a folding mirror. There are different variants of folding mirrors. In one, the mirror function may be curved to shape the light beam. In this case, it is not a flat mirror that is "Fresnellated/segmented" but a curved mirror. Or the areas of the segments may be manipulated, which generally approaches a scattering function, in order to homogenize the light distribution. Both are possible and potentially advantageous.

Pre-collimated light sources, which may consist of a plurality of individual light sources arranged side by side, also referred to as arrays, either radiate light directly onto diffusers behind the display element, also referred to below as a display, or are redirected beforehand by possibly curved folding mirrors. In these, microscopically, angle of incidence=angle of reflection. This leads to conflicts in term of installation space. In the corners/edges between array cells, particularly intensive color and brightness deviations may occur. Frequently, light-emitting diodes (LEDs) are used as light sources. The polarization direction of the LED light that does not match with the display polarizer is kept away from the display and is lost. Tilting the folding mirror by an angle changes the angle of the illuminating light by twice the angle.

Such solutions have an increased installation space requirement which restricts the image size, of the requirement of arrays with relatively high numbers of cells, color and brightness inhomogeneities, and losses in efficiency due to the loss of a polarization component. Improved concepts for image generating units which are to be brought into line with given installation space requirements are desired.

The core idea of the disclosure is a finely graded folding mirror 15 which macroscopically deviates from the angle of incidence=angle of reflection of a conventional mirror 14, see FIG. 4. The properties and freedoms thus attained open up an entire bunch of design possibilities with advantages going beyond savings in terms of installation space.

Figure 5:
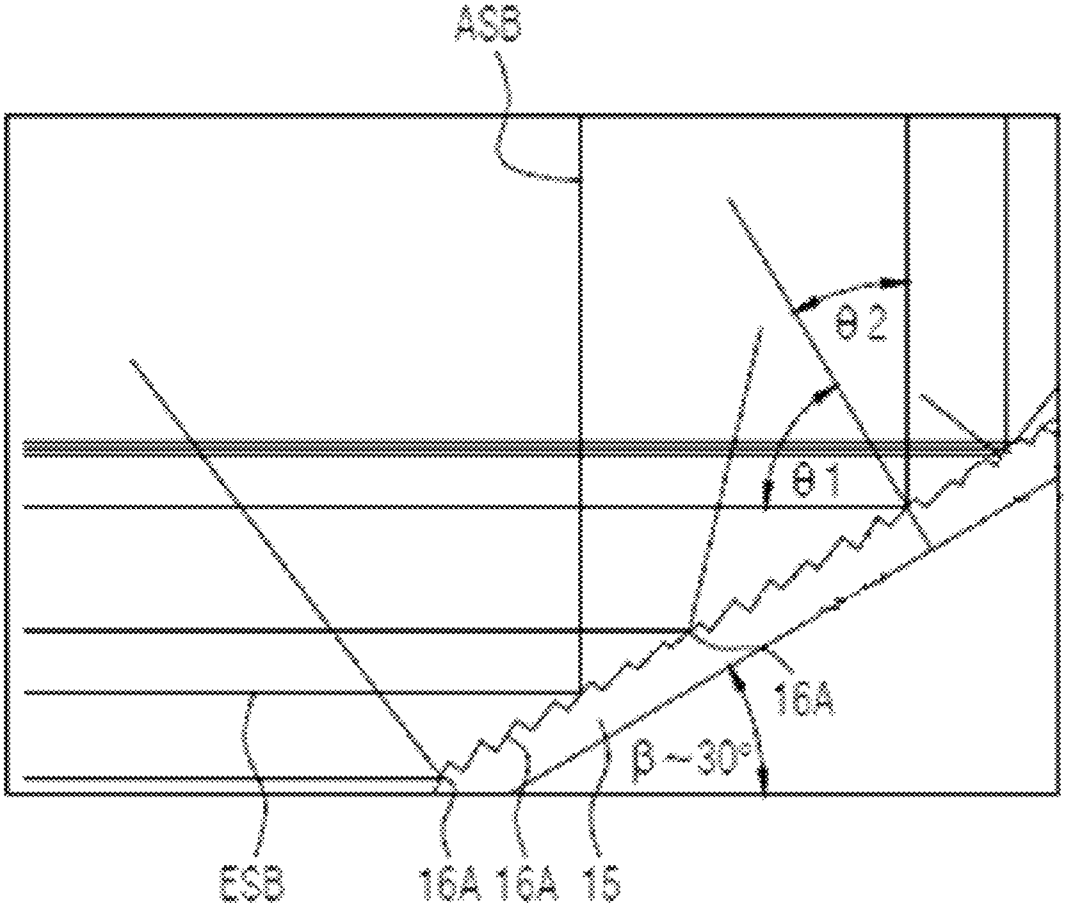
FIG. 5 schematically shows a folding mirror 15 of a head-up display.

FIG. 5 schematically shows a folding mirror 15 of a head-up display according to the disclosure, similar to the one shown in FIG. 4 above. It shows that the folding mirror 15 has many microstructures that each satisfy the known rule that the angle of incidence is equal to the angle of reflection. The difference between the angle of incidence and the angle of reflection for the microstructures is position-dependent.

The microstructures 16A shown on the lower left side of the folding mirror 15 have an angle of the reflective surface of each microstructure that decreases from the leftmost microstructure 16A to rightmost microstructure 16A which leads to an expansion of the reflected beam of rays.

Thus, according to the disclosure, there are particularly space-saving options for folding the beam path of the image generating unit 1 into the installation space. The light distribution is spread out by being divided into stripes that are pulled apart. In this way, the original illumination unit may be made smaller. This helps to avoid array boundaries in the image region and to improve the homogeneity. Design variants allow tolerance-insensitive designs and increased efficiency through polarization recycling. The folding mirror according to the invention is implemented by hologram technology. When implemented by a hologram, the hologram structure may be designed in such a way that no splitting into stripes may be detected, at least by the human user.

Further embodiment variants not shown here are: Transmissive design, possibly using total internal reflection. Design based on the pentamirror approach. Cascaded embodiment. Back-reflection in the gaps for polarization recycling. Curved embodiment.

According to the disclosure, the folding mirror, whose angle of incidence and angle of reflection are different, is arranged in the illumination path. This brings about various additional advantages, such as spreading of the illumination beam and the possibility of polarization recycling. According to one embodiment, no laser is used as the light source. This makes it possible to suitably adapt the scattering angle of the light source to better fill in the dark gaps. According to the disclosure, TIR and penta variants are made possible with "no coating required" and "insensitive to tolerances".

The invention claimed is:

1. A head-up display for a motor vehicle, comprising:

a picture generating unit for generating an image;

an optical unit for projecting the image through a mirror unit; and a folding mirror that macroscopically exhibits an angle of incidence greater than an angle of reflection and the folding mirror having Fresnel microstructures on a reflective surface that satisfy the known rule that the angle of incidence is equal to the angle of reflection, wherein the folding mirror is arranged in an illumination path between a light source and a display element through which light therefrom radiates, wherein the Fresnel microstructures are configured such that parallel incident rays impinging at different positions on the folding mirror are reflected at different reflection angles to increase a cross-sectional extent of an illumination beam, wherein the difference between the angle of incidence and the angle of reflection is position-dependent over the surface of the folding mirror, wherein the light only reflects on the reflecting surface of the folding mirror and does not pass through an inside of the folding mirror.

* * * * *